Nov. 1, 1949.                    I. CORDELL                    2,486,555
                      BORING MACHINE WITH CHIP REMOVER
Filed Nov. 13, 1944                                        2 Sheets-Sheet 1

INVENTOR.
IRVING CORDELL
BY
*G. H. Braddock*
ATTORNEY

Nov. 1, 1949.    I. CORDELL    2,486,555
BORING MACHINE WITH CHIP REMOVER
Filed Nov. 13, 1944    2 Sheets-Sheet 2
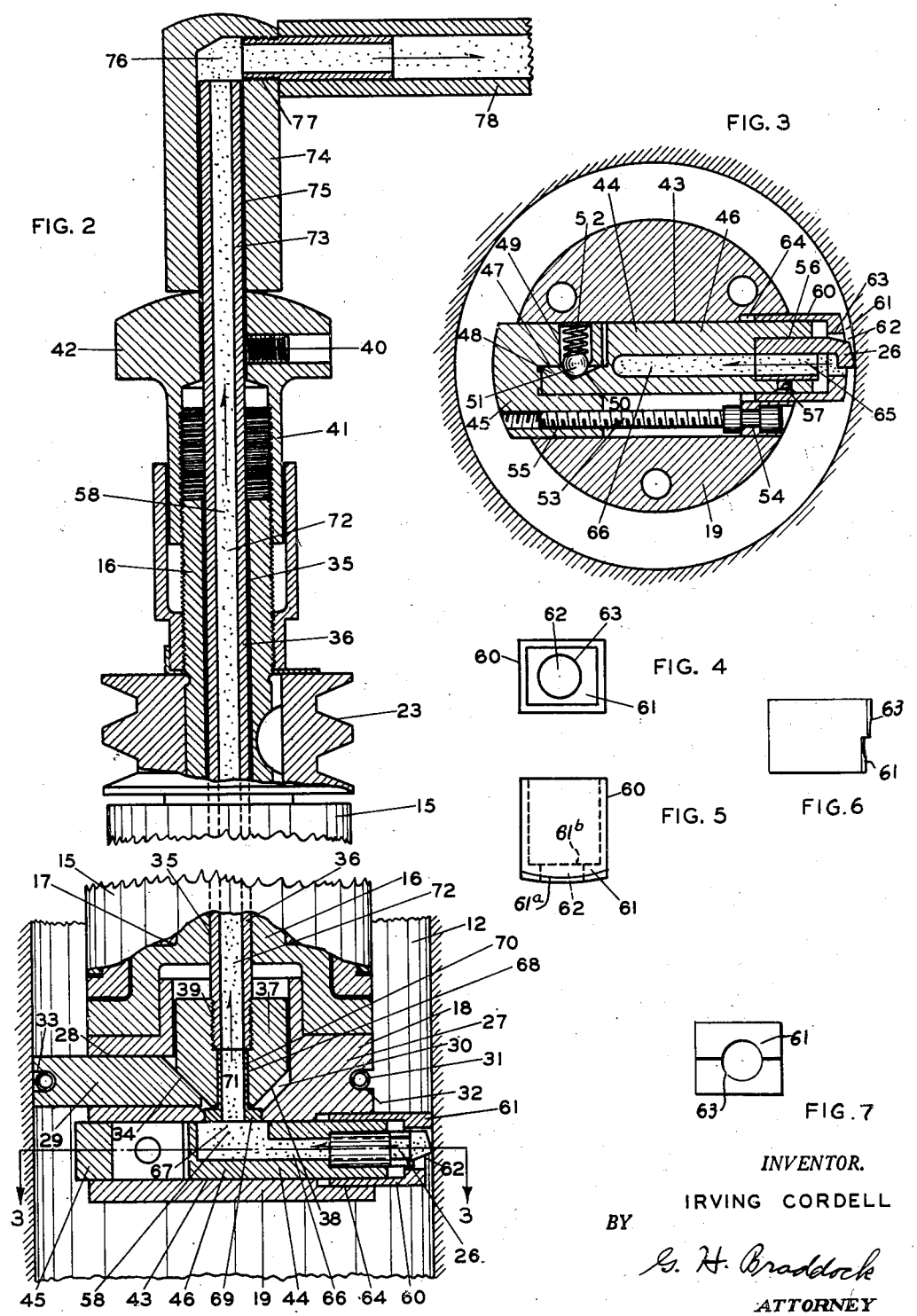
INVENTOR.
IRVING CORDELL
BY
G. H. Braddock
ATTORNEY Patented Nov. 1, 1949

2,486,555

UNITED STATES PATENT OFFICE 2,486,555

BORING MACHINE WITH CHIP REMOVER

Irving Cordell, Los Angeles, Calif., assignor to Storm Manufacturing Company, Inc., Minneapolis, Minn., a corporation of Minnesota Application November 13, 1944, Serial No. 563,212

2 Claims. (Cl. 77—4)

This invention has relation to a boring machine with chip remover. The word "chip" as used herein is intended to also include grit, dirt, dust, etc.

An object of the invention is to provide a boring machine with chip remover which will be of novel and improved construction.

A further object is to provide a boring machine with chip remover wherein will be incorporated various improved features and characteristics of construction novel both as individual entities of the boring machine with chip remover and in combination with each other.

A further object is to provide a boring machine which will include cutting means for detaching chips or other particles from a surface being bored and a novel and improved construction and arrangement incorporated in the machine in novel and improved manner for causing the detached chips or particles to be removed from said surface.

A further object is to provide a boring machine which will include a chip remover adapted to cause particles as cut from a surface being bored to be conveyed away from said surface and out of said boring machine through a passageway for the particles arranged interiorly of operative elements of the boring machine.

A further object is to provide a boring machine with chip remover adapted to cause particles to be detached from a surface being bored and to be removed from said surface via a passageway extending through elements of the machine for accomplishing the boring operation.

A further object is to provide a boring machine with chip remover which will include cutting means for causing particles to be detached from a surface being bored and means for conveying particles as detached from said surface out of the machine constituted as a passageway extending through operative elements of the machine and including a mouth portion or chip receiver in surrounding relation to said cutting means adapted to be constantly situated in engaged relation with said surface at location adjacent to the cutting means.

And a further object is to provide a boring machine with chip remover which will include features and characteristics of construction as hereinafter set forth.

With the above objects in view, as well as others which will appear as the specification proceeds, the invention comprises the construction, arrangement and combination of parts as now to be fully described and as hereinafter to be explicitly claimed, it being understood that the disclosure herein is merely illustrative of the principle of the invention and meant in no way in a limiting sense, changes in details of construction and arrangement of parts being permissible so long as within the spirit of the invention and the scope of the claims which follow.

In the accompanying drawings forming a part of this specification,

Fig. 2 is an enlarged vertical sectional view, partially in elevation and partially broken away, of the boring bar assembly of the boring machine with chip remover;

Fig. 3 is a detail sectional view, taken as on line 3—3 in Fig. 2;

Fig. 4 is an inner end elevational view disclosing a mouth portion or chip receiver of the boring machine with chip remover;

Fig. 5 is a bottom plan view of said mouth portion or chip receiver;

Fig. 6 is a side elevational view of the mouth piece or chip receiver; and

Fig. 7 is an outer end elevational view of said mouth piece or chip receiver.

Figure 1:
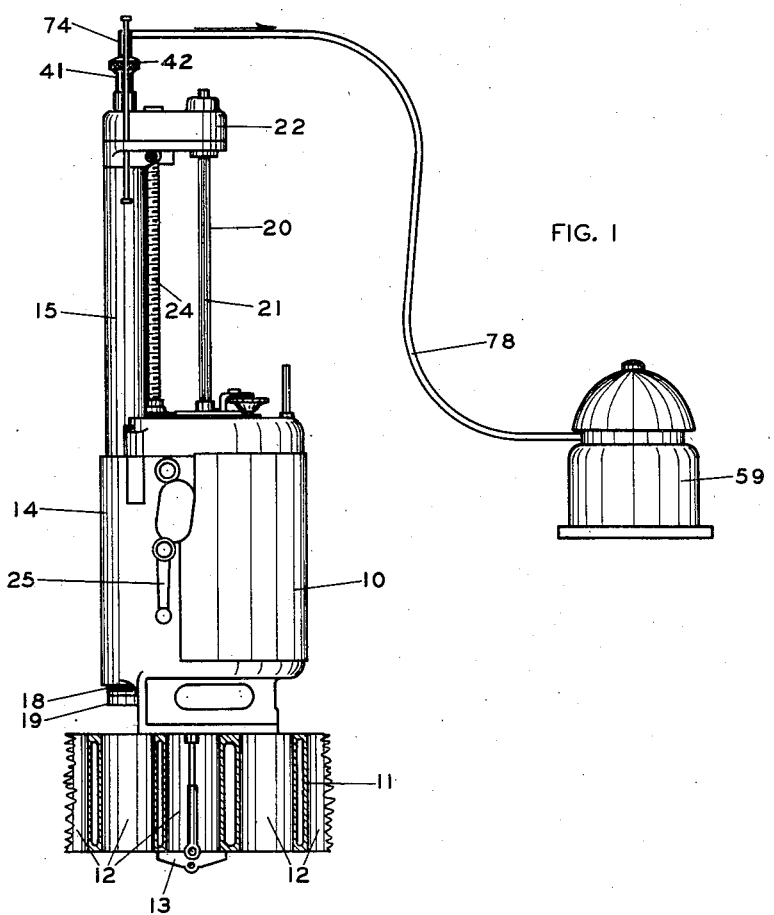
Fig. 1 is an elevational view of a boring machine with chip remover made according to the invention.

The boring machine with chip remover includes a frame 10 adapted to rest during operation of the machine upon a member having surfaces to be bored in position to be operative upon said surfaces. In the disclosed embodiment of the invention, said frame 10 is shown as resting upon an engine or cylinder block 11 in position to operate upon cylinders 12 contained by said block. A clamping device 13 is for the purpose of fastening the machine down upon the engine or cylinder block 11.

The frame 10 integrally includes a hollow, vertical bearing post 14, and a vertical sleeve 15 is mounted to be reciprocated in said vertical bearing post 14. Said vertical sleeve 15 may be held against rotary movement in the vertical bearing post 14 in any suitable and convenient manner. A cutter shaft 16 is rotatably mounted, as at 17, within the vertical sleeve 15 and is fixed against longitudinal movement in said vertical sleeve. A lower portion of the cutter shaft 16, below said vertical sleeve 15, carries a centering device 18, and the lower end of said cutter shaft, below said centering device, carries a cutter head 19 with cutter or cutting means.

The frame 10 suitably and conveniently supports an electric motor (not shown) arranged interiorly of said frame. Said electric motor is adapted to be driven in either direction and suitable gearing (not shown) situated within the frame 10 and driven by the electric motor is suitably and conveniently assembled with a vertical shaft 20 which is suitably and conveniently mounted in said frame and extends upwardly therefrom for a considerable distance. Said vertical shaft 20 is splined, as at 21.

A fitting 22 is rigidly connected to the upper end portion of the vertical sleeve 15 to provide a chamber (not shown) within the fitting. The vertical shaft 20 extends upwardly through the fitting 22 and its chamber and is slidable in said fitting and rotatable in said chamber. Said vertical shaft 20 slidably carries a series of drive pulleys (not shown) arranged within the chamber of the fitting 22 and fixed by the spline 21 to rotate with the vertical shaft. The cutter shaft 16 carries a series of drive pulleys 23, disposed in horizontal alinement with the drive pulleys upon said vertical shaft 20, situated upon a part of the cutter shaft which extends above the vertical sleeve 15. The drive pulleys 23 are also within the chamber of the fitting 22, and drive belts (not shown) within said chamber ride over the drive pulleys of the different sets, respectively, to cause the drive pulleys upon the vertical shaft 20 to be operatively connected to the drive pulleys 23 upon the cutter shaft 16. It will be apparent that when the electric motor within the frame 10 is driven to cause the vertical shaft 20 to be rotated, the cutter shaft 16 will in turn be rotated through the instrumentality of the drive pulleys and the belts within the fitting 22.

Mechanism for causing the vertical sleeve 15, and with it the cutter shaft 16, to be reciprocated in the hollow, vertical bearing post 14 includes a vertical feed screw 24 which projects upwardly from the frame 10. Said vertical feed screw 24 is threaded in a protuberance (not shown) rigid with the fitting 22. The upper end portion of the vertical feed screw is freely movable vertically in and through said fitting 22. The lower end of said vertical feed screw is rigidly secured to the upper end of a vertical shaft (not shown) which is rotatably mounted and fixed against longitudinal movement in the frame 10 in a manner forming no part of the present invention, and devices (not shown) within said frame 10 are provided whereby said vertical shaft carrying the feed screw and said feed screw can be rotated by the electric motor. The fitting 22, the pulleys within the chamber of said fitting, and the vertical sleeve 15 and the cutter shaft 16, as a unit, are adapted to be fed up and down in the machine, or reciprocated vertically, relative to the frame 10, by rotation of the vertical feed screw 24.

The machine incorporates means including a handle 25 for manually rotating the vertical feed screw 24 in either direction to accomplish upward or downward reciprocation of the vertical sleeve 15 independently of the mechanical drive for said vertical feed screw.

The machine will of course be set upon a member, such as the engine or cylinder block 11, to be operated upon so that the cutter shaft 16 and the cutter or cutting means, denoted 26, are properly centered before the frame 10 of the machine is clamped or fastened down upon said member or block. The centering device 18 is for properly centering said cutter shaft and cutter or cutting means, and includes a centering head 27, cylindrical as disclosed, suitably and conveniently supported upon the cutter shaft 16. Said centering head 27 has a horizontally disposed, radially extending guide slots 28 therein and each guide slot 28 slidably contains a centering finger 29. The axial portion of the centering head 27, at the location of the axis of the cutter shaft 16, is cut away, as at 30, and the inner end portion of each centering finger 29 lies in said cut-away portion 30. A continuous coil spring 31, surrounding the centering head 27 and lying in circumferentially extending grooves, denoted 32 and 33, in the perimeter of said centering head and the outer ends of the centering fingers 29, respectively, normally resiliently retains said centering fingers at their innermost positions in the centering head. An upper portion of the inner end of each centering finger 29 is beveled, as at 34, each bevel surface 34 extending downwardly and inwardly.

The cutter shaft 16 includes an axial passageway 35. The lower end of a vertical rod 36 slidably mounted in said axial passageway 35 rigidly supports a centering element 37 including a conical surface 38 upon its lower portion. The vertical rod 36 is, as disclosed at 39, threaded into the central portion of the centering element 37. Said centering element is situated in the cut-away portion 30 above the bevel surfaces 34 upon the upper portions of the inner ends of the centering fingers 29, and the conical surface 38 is adapted to be engaged with each of said bevel surfaces 34. An upper portion of the vertical rod 36 is secured, as at 40, to a screw member 41 threaded upon the upper end of the cutter shaft 16 to be moved longitudinally of said cutter shaft by turning movement of said screw member. A hand piece 42 upon the screw member 41 may be employed to rotate said screw member. The connection 40 between the vertical rod 36 and the screw member 41 is as disclosed constituted as a set screw within the hand piece 42.

In practice, the cutter shaft 16 is lowered or depressed to situate the centering head 27 within a cylinder to be bored, and with said centering head so situated, the screw member 41 is turned in proper direction to be moved downwardly on the cutter shaft 16. Such movement of said screw member 41 will obviously move the conical surface 38 of the centering element 37 downwardly relative to the centering fingers 29, and said conical surface will slide over the bevel surfaces 34 of all of the centering fingers 29 to cause said centering fingers to move, each in equal amount, outwardly of the centering head 27 and into engagement with the wall of the cylinder to be bored. After the centering operation is thus accomplished, the screw member 41 is turned in opposite direction and the continuous coil spring 31 returns the centering fingers 29 to their normal, inward positions. During a boring operation said centering fingers 29 are at their innermost positions in the centering head 27, and clear of the cylinder being worked upon.

The cutter head 19 has a horizontal passageway 43 therethrough. A holder 44 for the cutter or cutting means 26 is adjustable lengthwise of said horizontal passageway 43. As disclosed, said holder 44 consists of two detachably connected elements, denoted 45 and 46, respectively, snugly and slidably mounted in the horizontal passageway 43. The element 45, at the side of the cutter head 19 opposite the cutter or cutting means 26 has a central portion thereof cut away, as at 47, to receive an extension piece 48 of the element 46. A horizontal transverse opening 49 through a part of the element 45, perpendicular to said extension piece 48 and adjacent a depression 50 in the extension piece, resiliently retains a ball 51 in its end portion adjacent said extension piece. A coil spring 52 within the horizontal transverse opening 49, between a wall of the horizontal passageway 43 and the ball 51, resiliently urges said ball into the depression 50 to thus detachably connect the elements 45 and 46 to each other while within said horizontal opening 43. A cutter holder adjusting screw 53 is rotatably mounted, as at 54, in the cutter head 19 against the possibility of longitudinal movement, and the end portion of said adjusting screw 53 opposite the cutter or cutting means 26 is adjustably threaded, as at 55, in the element 45. By turning movement of the adjusting screw 53 the cutter holder 44, with the cutter or cutting means 26, will evidently be adjusted longitudinally of the horizontal passageway 43 so that said cutter or cutting means will be adjusted axially and radially of the cutter shaft 16. Said cutter or cutting means 26 is alined with the holder 44 and has its inner end portion fitted into a socket 56 of said holder. As disclosed, said inner end portion of the cutter or cutting means is fixedly retained in the socket 56 by a set screw 57 countersunk into a wall of the element 46 of said holder.

The machine includes a construction and arrangement for conveying chips or particles from a surface being bored clear of said surface and out of the machine constituted as a passageway 58 extending through operative elements of said machine and including a mouth portion or chip receiver in surrounding relation to the cutter or cutting means, such as 26, adapted to be constantly situated in engaged relation with the surface being bored at location adjacent to the cutter or cutting means thus to be capable of receiving chips or particles as detached from the surface by said cutter or cutting means, and an exhauster 59 for causing chips or particles as detached from said surface and deposited in said mouth portion or chip receiver to be drawn through said passageway.

A mouth piece of the passageway 58 consists of a cup shape member including a hollow, rectilinear skirt portion 60 and a base 61 having a centrally disposed opening 62 therethrough. Said base has an outer portion 61a and an inner portion 61b. Said base 61 is as disclosed integral with the skirt 60, and said centrally disposed opening 62 is defined or bounded by an internal cylindrical surface 63 of the base of said mouth piece. The rectilinear skirt 60 is slidably fitted in fluid-tight manner upon the end portion 46 of the element 46 of the holder 44 which supports the cutter or cutting means 26 and into a rectangular slot 64 in the cutter head 19 contiguously surrounding said element 46 in such manner that the internal cylindrical surface 63 defining or bounding the opening 62 is in slightly spaced, surrounding relation to the protruding part of the cutter or cutting means 26. The construction and arrangement will desirably be such that the mouth piece will be moved outwardly of the holder 44 and the cutter head 19 by centrifugal force with rotation of said cutter head so that the base 61 of said mouth piece will constantly engage the cylinder wall during operation of the machine. Thus the mouth piece will evidently be situated to receive all chips or particles as removed by the cutter or cutting means 26 from the surface being bored. Desirably, means may be included for precluding movement of the skirt 60 completely out of the rectangular slot 64 when the cutter head is clear of a cylinder, thus to preclude accidental removal of the mouth piece or chip receiver from the cutter head and holder.

The imbedded part of the cutter or cutting means 26 includes a horizontal port 65, constituted as a part of the passageway 58, the outer end of which is open to the interior of the mouth piece and the inner end of which is open to a horizontal port 66 in the holder 44.

The horizontal port 66 in said holder 44 is open to a vertical port 67 in the holder, and both of the ports 66 and 67 constitute parts of said passageway 58.

The centering element 37 includes a centrally disposed, vertical opening, alined with and beneath the vertical rod 36, defined by an internal cylindrical surface 68 which is continuous from the lower end of said vertical rod to the lower end of said centering element. A closure and guide device is constituted as a disc shape base 69, fixed in a lower portion of the centering head 27 to close off the cut-away portion 30 from the vertical port 67, and a cylindrical, vertical sleeve 70 integral with and extending upwardly from said disc shape base 69. The internal cylindrical surface 68 defining the vertical opening in said centering element 37 is adapted to be slid in fluid-tight manner upon the vertical sleeve 70 when the centering element is adjusted vertically, in the manner as hereinbefore set forth, and the construction and arrangement will be such that said centering element will not be completely removed from said vertical sleeve even when the centering element is at its most elevated position. The disc shape base 69 is as shown below the elevation of the centering fingers 29, and the inner ends of said centering fingers will be engaged against the vertical sleeve 70 when the centering fingers are held at their innermost positions by the continuous coil spring 31, as will be apparent.

What may be termed a vertical port 71, constituted as a part of the passageway 58, extends through the disc shape base 69 and the vertical sleeve 70 of the closure and guide device, and the vertical port 67 in the holder 44 is open at its upper end to the lower end of said vertical port 71.

The vertical rod 36 is hollow, and what may be termed a vertical port 72, constituted as a part of said passageway 58, extends through said vertical rod 36. The vertical port 71 through the base 69 and the vertical sleeve 70 of the closure and guide device is open at its upper end to the lower end of said vertical port 72.

The upper end portion 73 of said vertical rod 36 extends upwardly to position somewhat above the screw member 41. A fitting 74, adapted to rest upon said screw member 41, includes a longitudinal opening 75, and said upper end portion 73 of the vertical rod 36 is adapted to be slidably and rotatably situated in fluid-tight manner in said longitudinal opening 75. The vertical port 72 through said vertical rod 36 is open at its upper end to a chamber 76 of the fitting 74 above the vertical rod.

A transverse opening 77 at the upper end of said fitting 74 receives a pipe connection 78 which leads from the chamber 76 to the exhauster 59.

The manner in which the machine is operative will be obvious. Chips or particles detached from a cylinder being bored and deposited within the mouth piece or chip receiver of the passageway 58 will be conveyed by suction along said passageway 58 to the exhauster 59 whenever said exhauster is operative.

The mouth piece or chip receiver remains engaged against the wall of a cylinder being bored at all times when the cutter head is rotating, and an air receiving slot in the base 61 of said mouth piece or chip receiver is for permitting the entrance of air into the mouth piece or chip receiver from the cylinder at all times while the exhauster is operative. In any instance where considered desirable, the base 61 of the mouth piece or chip receiver could have a relatively free or uneven fit against the cylinder wall providing an aperture for permitting passage of air from the cylinder into the mouth piece or chip receiver.

What is claimed is:

1. The combination with a boring machine having a vertical bearing, a vertical sleeve reciprocably and nonrotatably mounted in said vertical bearing, a cutter shaft rotatably mounted in and fixed against longitudinal movement relative to said vertical sleeve, a cutter head secured to said cutter shaft, a radially extending cutting means carried by said cutter head and a continuous passageway leading from said cutting means past said cutter head and upwardly along said cutter shaft, of a chip receiver constituted as a hollow member rotatable with said cutter head and bounding a passageway open at an outer portion of the chip receiver to said cutting means and at an inner portion of said chip receiver to said continuous passageway.

2. The combination as specified in claim 1, wherein said outer and inner portions of said hollow member are in alinement radially of said cutter head.

IRVING CORDELL.

REFERENCES CITED

The following references are of record in the file of this patent:

UNITED STATES PATENTS

| Number | Name | Date |
|---|---|---|
| 2,081,487 | Lane | May 25, 1937 |
| 2,092,101 | Wickersham et al. | Sept. 7, 1937 |
| 2,412,937 | Allen | Dec. 24, 1946 |

FOREIGN PATENTS

| Number | Country | Date |
|---|---|---|
| 427,181 | Great Britain | Apr. 15, 1935 |